(12) United States Patent
Monmeyran et al.

(10) Patent No.: US 12,508,799 B2
(45) Date of Patent: Dec. 30, 2025

(54) HEATABLE LOW-E GLAZING COMPRISING TWO LAYERS BASED ON TITANIUM NITRIDE

(71) Applicant: SAINT-GOBAIN GLASS FRANCE, Courbevoie (FR)

(72) Inventors: Corentin Monmeyran, Paris (FR); Julie Ruff, Aachen (DE); Vincent Reymond, Antony (FR); Norbert Huhn, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 455 days.

(21) Appl. No.: 18/011,053

(22) PCT Filed: Jun. 16, 2021

(86) PCT No.: PCT/EP2021/066211
§ 371 (c)(1),
(2) Date: Dec. 16, 2022

(87) PCT Pub. No.: WO2021/255079
PCT Pub. Date: Dec. 23, 2021

(65) Prior Publication Data
US 2023/0339212 A1    Oct. 26, 2023

(30) Foreign Application Priority Data
Jun. 19, 2020 (EP) .................................. 20315309

(51) Int. Cl.
*B32B 15/04* (2006.01)
*B32B 17/06* (2006.01)
*B32B 17/10* (2006.01)

(52) U.S. Cl.
CPC .. *B32B 17/10229* (2013.01); *B32B 17/10036* (2013.01); *B32B 17/1011* (2013.01); *B32B 17/10651* (2013.01); *B32B 2307/204* (2013.01); *B32B 2307/4026* (2013.01); *B32B 2307/7376* (2023.05); *B32B 2605/08* (2013.01)

(58) Field of Classification Search
CPC .................................................. C03C 17/366
USPC ........................................ 428/432, 428, 426
See application file for complete search history.

(56) References Cited

U.S. PATENT DOCUMENTS

| | | | |
|---|---|---|---|
| 5,085,926 A * | 2/1992 | Lida | C03C 17/36 359/359 |
| 5,216,542 A * | 6/1993 | Szczyrbowski | C03C 17/3435 427/166 |
| 6,188,512 B1 * | 2/2001 | Woodard | G02B 5/208 359/359 |
| 8,286,395 B2 * | 10/2012 | Mauvernay | C03C 17/3652 52/204.5 |
| 10,294,147 B2 * | 5/2019 | Lu | C03C 17/3435 |
| 10,365,409 B2 * | 7/2019 | Henn | C23C 14/35 |
| 10,392,300 B2 * | 8/2019 | Boyce | E06B 9/24 |
| 10,676,986 B2 * | 6/2020 | Tucker | C23C 14/185 |
| 10,948,629 B2 * | 3/2021 | Hart | C03C 17/3411 |
| 11,401,205 B2 * | 8/2022 | Reymond | B32B 27/30 |
| 11,884,580 B2 * | 1/2024 | Monmeyran | C03C 17/3649 |
| 2002/0192473 A1 * | 12/2002 | Gentilhomme | C03C 17/3618 359/359 |
| 2008/0226882 A1 * | 9/2008 | Belliot | C03C 17/3435 428/209 |
| 2009/0104385 A1 * | 4/2009 | Reymond | C03C 17/3435 428/34 |
| 2009/0136765 A1 * | 5/2009 | Maschwitz | C03C 17/36 427/160 |
| 2009/0176086 A1 * | 7/2009 | Martin | C03C 17/3618 204/192.27 |
| 2010/0027383 A1 * | 2/2010 | Suzuki | C03C 17/42 204/192.15 |
| 2011/0261442 A1 * | 10/2011 | Knoll | C03C 17/3626 359/360 |
| 2011/0262726 A1 * | 10/2011 | Knoll | C03C 17/36 428/428 |
| 2012/0219821 A1 * | 8/2012 | Frank | C03C 17/3639 156/60 |
| 2012/0225304 A1 * | 9/2012 | Imran | C03C 17/3652 427/160 |
| 2014/0022630 A1 * | 1/2014 | Reymond | C03C 17/3626 359/360 |
| 2018/0187477 A1 * | 7/2018 | Tucker | C03C 17/3681 |

FOREIGN PATENT DOCUMENTS

| | | |
|---|---|---|
| CN | 1489556 A | 4/2004 |
| CN | 105481266 A | 4/2016 |
| CN | 110382430 A | 10/2019 |
| CN | 111247108 A | 6/2020 |
| DE | 40 06 029 A1 | 8/1990 |
| JP | 2001-226147 A | 8/2001 |
| WO | WO 2014/127867 A1 | 8/2014 |
| WO | WO 2019/002737 A1 | 1/2019 |

OTHER PUBLICATIONS

CN105481266A English translation 2016.*

(Continued)

*Primary Examiner* — Lauren R Colgan
(74) *Attorney, Agent, or Firm* — Pillsbury Winthrop Shaw Pittman LLP

(57) ABSTRACT

A glass article with solar control properties, includes a glass substrate provided with a stack of layers that includes successively from the surface of the substrate a first module $M_1$ made of layer(s) of dielectric material, a first layer $TiN_1$ including titanium nitride, a second module $M_2$ made of layer(s) of dielectric material, a second layer $TiN_2$ including titanium nitride, a third module $M_3$ made of layer(s) of dielectric material. The total thickness the $TiN_1$ and $TiN_2$ layers including titanium nitride is between 25 and 60 nm. The third module $M_3$ includes a layer including an oxide or oxynitride of silicon having a thickness greater than 10 nm. An interlayer IL of titanium, aluminum, silicon, or an alloy thereof, or of a nickel chromium alloy, is deposited between the second layer $TiN_2$ and the third module $M_3$, the thickness of the interlayer IL being between 0.5 nm and 7 nm.

20 Claims, No Drawings

(56) References Cited

OTHER PUBLICATIONS

International Search Report as issued in International Patent Application No. PCT/EP2021/066211, dated Sep. 21, 2021.
Search Report as issued in Chinese Patent Application No. 202180043721.9. dated Dec. 12, 2023.

* cited by examiner

HEATABLE LOW-E GLAZING COMPRISING TWO LAYERS BASED ON TITANIUM NITRIDE

CROSS-REFERENCE TO RELATED APPLICATIONS

This application is the U.S. National Stage of PCT/EP2021/066211, filed Jun. 16, 2021, which in turn claims priority to European patent application number 20315309.3 filed Jun. 19, 2020. The content of these applications are incorporated herein by reference in their entireties.

The invention relates to low emissivity insulating glazing, provided with stacks comprising thin "functional" layers (presently based on titanium nitride), that is to say acting on solar and/or thermal radiation essentially by reflection and/or absorption of near infrared (solar) or far infrared (thermal) radiation. The application more particularly targeted by the invention is, firstly, vehicle glazings, such as side windows, sunroofs or rear windows. Without departing from the context of the invention, the present glazing can also be used in the field of the construction industry, as solar control glazing.

"Functional" or also "active" layer is understood to mean, within the meaning of the present patent application, the layers of the stack which confer, on the stack, the bulk of its thermal insulation properties. Generally, stacks made of thin layers equipping the glazing confer on it substantially improved insulation properties very essentially by the intrinsic properties of said active layers. Said layers act on the stream of thermal infrared radiation passing through said glazing, in contrast to the other layers, generally made of dielectric material and generally mainly having the function of chemical or mechanical protection of said functional layers. Dielectric material is understood to mean a material, the bulk impurity-free form of which exhibits a high resistivity, for example a resistivity of greater than $10^{10}$ ohms·meters ($\Omega$·m) at 25° C.

Such glazings provided with stacks of thin layers act on the incident solar radiation either essentially by absorption of the incident radiation by the functional layer(s) or essentially by reflection by these same layers.

They are grouped together under the designation of solar control glazing. They are commercially available and used essentially:

- either to provide essentially protection of the passenger compartment (motor vehicle) or of the dwelling from solar radiation and to prevent overheating thereof, such glazings being described in the industry as solar protection glazings,
- or essentially to provide thermal insulation of the dwelling and to prevent losses of heat, these glazings being described as insulating glazings.

Thermal insulation glazing is understood to mean a glazing provided with at least one functional layer conferring on it a reduced energy loss, said layer exhibiting properties of reflecting IR radiation of between 5 and 50 micrometers. The functional layers used in this function exhibit a high IR radiation reflection coefficient and are said to be low-emissive (or low-e). In application, such as the motor vehicle industry, it is often desired to limit the amount of heat entering the passenger compartment of the vehicle, that is to say to limit the energy transmission of the solar radiation through the glazing. A conventional parameters used in the field to evaluate this capability is the normal emissivity $\varepsilon_n$ of the glazing as calculated in the standard ISO 10292 (1994), Annex A.

Generally, all the light and thermal characteristics presented in the present description are obtained according to the principles and methods described in the international standards ISO 9050 (2003) and ISO 10292 (1994), respectively relating to the determination of the light and energy characteristics of the glazings used in glass for the construction industry.

Glazings additionally providing improved visual comfort, in particular in the motor vehicle field (as side window, rear window or also as sunroof), are currently sought in particular. One of the objects of the present invention, in order to respond to such a demand, is to provide suitable glazing which allows the passengers of the vehicle or the occupants of the building not to be or to be hardly visible from the outside in the light of the day but to be able on their side to see, without any bother, the external environment. Such a glazing comprises from the outside a first glass substrate, preferably tinted in its bulk, bonded to a second substrate by an intermediate thermoplastic sheet, in particular made of PVB which can also be tinted, said second substrate being made preferably of clear glass and provided with said stack of layers preferably positioned on its face exposed toward the inside of the car compartment. From this requirement, a light transmission comprised between 20 and 40% for a constitution article made of a clear glass coated with the present stack of layers is needed by the current market to get a final laminated glazing with a light transmission below 10%. Moreover, a low light reflection of the constitution article made of a clear glass coated with the present stack of layers is also required, notably below 10% preferably around or below 5%, as measured on the side of the article where said stack is deposited.

Another essential characteristic of a glazing is its capability to withstand heat treatments and more particularly bending, more particularly in the vehicle glazings field.

Such ability is usually measured first of all by the appearance (or rather the absence) of physical damages after such treatment, such as cracks appearing in the coating and highly visible to vehicle passengers.

Another criterion is also the ability of the glazing which has undergone said heat treatment to maintain (or even improve) its thermal insulation properties, as measured by the normal emissivity described above.

The most effective stacks currently sold to solve the preceding complex problems are often deposited by magnetron sputtering techniques and incorporate a metal layer of the silver type operating essentially on the mode of the reflection of a major part of the incident IR (infrared) radiation. These stacks are thus used mainly as glazings of the low-emissive (or low-e) type for the thermal insulation of buildings and also vehicles. However, these layers are very sensitive to moisture which explained that they can hardly be used on a single glazing and are thus mainly used in double glazings or laminated glazing, on face 2 or 3 thereof, in order to be protected from moisture. The stacks according to the invention do not comprise such layers of the silver type, or indeed of the gold or platinum or indeed copper type. More generally, the stacks according to the invention do not contain such precious metals, or else in very negligible amounts, in particular in the form of unavoidable impurities.

Other insulating glazing based on stacks with titanium nitride or titanium oxynitride as the functional layer(s) have been proposed, using silicon nitride as the dielectric layers above, upon and between said functional layers, for example in publications WO2019/002737 or U.S. Ser. No. 10/294,147B2. However, the experiments made by the applicant, as reported below, showed that the coating of such glazing exhibits cracks when they undergo a heat treatment like a bending, as currently operated in the technical field of the present application.

The development of novel and adapted stacks is then made necessary by certain specific applications or arrangements.

According to the results obtained by the applicant company, the above problems have been solved by glass articles and glazing as described now.

According to a first aspect, the present invention relates to a glass article with solar control properties, more particularly useful for the manufacturing of vehicle glazing such as car roofs or for the manufacturing of architectural glazing for buildings, comprising at least one glass substrate provided with a stack of layers, wherein the stack comprises successively from the surface of said substrate:
- a first module $M_1$ consisting of layer(s) comprising dielectric material, and preferably based on dielectric material,
- a first layer $TiN_1$ comprising titanium nitride,
- a second module $M_2$ consisting of layer(s) comprising dielectric material, and preferably based on dielectric material,
- a second layer $TiN_2$ comprising titanium nitride,
- a third module $M_3$ consisting of layer(s) comprising dielectric material, and preferably based on dielectric material, wherein the cumulative sum of the thicknesses of the $TiN_1$ and $TiN_2$ layers comprising titanium nitride is between 25 and 60 nm, wherein the third module $M_3$ comprises a layer comprising an oxide of silicon or an oxynitride of silicon having a thickness greater than 10 nm, and wherein an interlayer IL of titanium, aluminum, silicon, an alloy of at least two of these elements, or of a nickel chromium alloy, is deposited between said second layer $TiN_2$ and said third module $M_3$, the thickness of said interlayer IL being between 0.5 nm and 7 nm.

More particularly the invention relates to a glass article, in particular a vehicle or building glazing with solar control properties, comprising at least one glass substrate provided with a stack of layers, wherein the stack comprises successively from the surface of said substrate:
- a first module $M_1$ comprising a layer based on a dielectric material of thickness $t_1$ or a set of layers based on dielectric materials of cumulative thickness $t_1$,
- a first $TiN_1$ layer comprising titanium nitride, with a thickness of between 10 nanometers and 30 nanometers,
- a second module $M_2$ comprising a layer based on a dielectric material of thickness $t_2$ or a set of layers based on dielectric materials of cumulative thickness $t_2$,
- a second $TiN_2$ layer comprising titanium nitride with a thickness of between 10 nanometers and 30 nanometers,
- a third module $M_3$ comprising a layer based on a dielectric material of thickness $t_3$ or a set of layers based on dielectric materials of cumulative thickness $t_3$, wherein the cumulative sum of the thicknesses of the $TiN_1$ and $TiN_2$ layers comprising titanium nitride is between 25 and 60 nm,
wherein the third module $M_3$ comprises a layer comprising an oxide or oxynitride of silicon having a thickness greater than 10 nm, preferably greater than 20 nm, and wherein an interlayer IL of titanium, aluminum, silicon, an alloy of at least two of these elements, or of a nickel chromium alloy, is deposited between said second layer $TiN_2$ and said third module $M_3$, the thickness of said interlayer IL being between 0.5 nm and 7 nm, preferably between 1 nm and 6 nm.

It has been discovered that such articles made it possible effectively to solve the technical problem described above.

Preferred embodiments of the present invention are reported in the attached claims, which can, of course and if appropriate, be combined one with another.

According to other preferred embodiments but not all reported in the claims:
- The cumulative thickness $TiN_1+TiN_2$ of the first layers based on titanium nitride and second layer based on titanium nitride is less than 50 nm, preferably is less than 45 nm.
- The ratio of the thicknesses $t_1/t_6$ is less than 0.55.
- The thickness $TiN_1$ of the first layer based on titanium nitride is of between 15 nm and 25 nanometers, limits included.
- The thickness $TiN_2$ of the second layer based on titanium nitride is of between nm and 25 nanometers, limits included.
- the thickness $t_1$ of the first module $M_1$ is between 1 nm and 50 nanometers, including boundaries,
- The thickness $t_h$ of the first module $M_1$ is less than 25 nm, in particular of between 1 nm and 25 nanometers, limits included, preferably between 4 nm and nanometers, limits included.
- The thickness $t_2$ of the second module $M_2$ is between 20 nm and 100 nm including boundaries,
- The thickness $t_2$ of the second module $M_2$ is of between 20 nm and 100 nm, limits included, preferably is of between 25 nm and 80 nm, limits included.
- The thickness $t_3$ of the third module $M_3$ is of between 20 nm and 65 nanometers, limits included, preferably is of between 25 nm and 60 nanometers, limits included, and very preferably is of between 30 nm and 50 nanometers, limits included.
- The coating does not contain a layer based on silver or on gold.
- The coating does not contain a layer based on a transparent conductive layer (TCO) such as ITO or $SnO_2$:F.
- $M_1$ consists of a single layer based on a dielectric material.
- $M_1$ includes and more preferably is a single layer comprising silicon nitride or silicon oxide, preferably based on silicon nitride or on silicon oxide and more preferably is a single layer comprising or based on silicon nitride.
- $M_2$ is a single layer comprising or based on a single dielectric material, preferably chosen from silicon oxide or silicon oxynitride, preferably comprising or based on silicon dioxide.
- $M_2$ is a set of layers made of dielectric materials, including preferably a layer comprising or based on a material chosen from silicon oxide or silicon oxynitride.
- $M_2$ includes at least a layer comprising silicon nitride and a layer comprising silicon oxide, interlayer(s) IL being deposited between a titanium nitride layer and the layer comprising silicon oxide.
- $M_2$ is a set of layers made of dielectric materials, said set being constituted by layer(s) comprising or based on a material chosen from silicon oxide or silicon oxynitride and layer(s) comprising or based on silicon nitride.
- $M_2$ is a set of layers made of dielectric materials, said set being constituted by a first layer comprising or based on silicon nitride, a layer comprising or based on a material chosen from silicon oxide or silicon oxynitride and a second layer comprising or based on silicon nitride.

The silicon oxynitride-based layers are characterized by a refractive index at 550 nm intermediate between a non-nitrided oxide layer and a non-oxided nitride layer. The silicon oxynitride-based layers preferably have a refractive index at 550 nm greater than 1.55, 1.60 or 1.70 or between 1.55 and 1.99; 1.60 and 1.97; 1.70 and 1.95 or 1.70 and 1.90.

The silicon oxynitride material mentioned above exhibits a molar ratio O/(O+N) of between 0.94 and 0.25, preferably of between 0.87 and 0.36.

$M_3$ does not include a layer comprising silicon nitride.

$M_1$ and $M_3$ are single layers.

The $TiN_1$ layer has a thickness greater than the $TiN_2$ layer.

The $TiN_2$ layer has a thickness greater than the $TiN_1$ layer

The thickness of the interlayer(s) IL is of between 1 and 6 nm, more preferably of between 2 and 5 nm, boundaries included.

The interlayer(s) IL is/are made of titanium, aluminum, silicon, an alloy of at least two of these elements and more preferably are made of titanium.

The glass substrate on which the stack is deposited is made of clear glass.

The glazing comprises two glass substrates assembled by a thermoplastic sheet, said glazing being provided with said stack of layers, said stack preferably being positioned on the face of a substrate facing an exterior surface of said glazing.

The preceding glazing comprises a first glass substrate, preferably tinted in its bulk, bonded to a second substrate by an intermediate thermoplastic sheet, in particular made of PVB, said second substrate being made of clear glass and provided with said stack of layers preferably positioned on its face exposed toward the exterior face of said glazing. Tinted in its bulk is understood to mean that the substrate comprises, in its glass composition, elements targeted at conferring a coloration on it (i.e. different from that of a "clear" glass), in particular elements such as cobalt, iron, selenium, indeed even chromium, which can also be targeted at reducing the light transmission thereof.

Said glass substrate(s) are tempered or bent.

Preferably, the layers of titanium nitride are based on titanium nitride or more preferably are made essentially of titanium nitride.

Titanium-based layers according to the invention comprise, for example, more than 50% by weight of titanium nitride, preferably more than 80% or even more than 90% by weight of titanium nitride.

The titanium nitride according to the invention is not necessarily stoichiometric (Ti/N atomic ratio of 1) but can be over- or sub-stoichiometric. According to an advantageous embodiment, the N/Ti ratio is of between 1 and 1.2. Also, the titanium nitride according to the invention can comprise a minor quantity of oxygen, for example between 1 mol % and 10 mol % of oxygen, in particular between 1 mol % and 5 mol % of oxygen.

According to a particularly preferred form, the titanium nitride layers according to the invention correspond to the general formula $TiN_xO_y$, in which $1.00<x<1.20$ and in which $0.01<y<0.10$.

The dielectric materials, once deposited as thin layers, can, however, comprise additional elements which substantially increase their electrical conductivity, of use, for example, for improving the cathode sputtering yield of the precursor material constituting the magnetron target. Preferably, the modules $M_1$, $M_2$ and $M_3$ comprise or consist of layer(s) chosen from materials based on silicon nitride, silicon oxynitride and silicon oxide. A material based on silicon nitride, silicon oxide, or silicon oxynitride is, for example, a material made principally, and preferably essentially, of such a compound but which can also nevertheless contain other minority elements, in particular as replacement for the cations, in particular in order to promote the deposition thereof in the form of thin layers by the usual techniques of magnetron sputtering as described above. By way of example, the layers according to the present invention made of silicon nitride or of silicon oxynitride, indeed even of silicon oxide, in particular those deposited by magnetron, generally comprise additional elements such as Al, Zr, B, and the like, in proportions which can range, for example, up to 10 atom %, even sometimes up to 20% or even up to atom %, based on total amount of cations (i.e. atoms other than O and N within said layer).

The glazing according to the invention can be a single glazing comprising a single glass substrate, possibly tinted in its mass, in which the stack of thin layers is positioned on face 2 of the single glazing, the faces of the substrate being numbered from the outside toward the inside of the building or of the passenger compartment which it equips.

According to another embodiment, in particular for use in the motor vehicle field, the glazing according to the invention can be a laminated glazing, comprising two glass substrates assembled by a thermoplastic sheet, said glazing being provided with a stack of layers as is described above. Preferably, the stack is deposited on the face of the substrate facing the interior of the building or of the passenger compartment which it equips.

The glass article described above can very obviously be tempered and/or bent.

A process for the manufacture of an article/glazing according to the invention comprises, for example, at least the following stages:

a glass substrate is introduced into a cathode sputtering device, in a first compartment, at least one underlayer of a dielectric material is deposited, in a subsequent compartment, a titanium target is sputtered by means of a plasma generated from a nitrogen-comprising gas, in a subsequent compartment, at least one intermediate layer of a dielectric material is deposited, in a subsequent compartment, a titanium target is sputtered by means of a plasma generated from a nitrogen-comprising gas, in a subsequent compartment, at least one overlayer of a dielectric material is deposited.

In addition, where appropriated within the stack, in an intermediate compartment, a metallic target made of titanium, aluminum, silicon, an alloy of at least two of these elements, or of a nickel chromium alloy is sputtered by means of a plasma generated from argon gas, for the deposition of the above-mentioned IL interlayer.

The terms "underlayer" and "overlayer" refer, in the present description, to the respective positions of said layers with respect to the functional layer(s) in the stack, said stack being supported by the glass substrate. In particular, when the stack contains a single underlayer and a single overlayer, the underlayer is the layer in contact with the glass substrate and the overlayer is the outermost layer of the stack, facing away from the substrate.

The term "interlayer" denotes the layer(s) positioned between two related layers disposed respectively under and over it, one of this related layer being typically a layer comprising titanium nitride.

Thickness of a layer is understood to mean, within the meaning of the present invention, the true geometric thickness of the layer, as can be measured in particular by conventional electron microscopy techniques or another technique.

The coatings according to the current invention are conventionally deposited by deposition techniques of the type of magnetic field-assisted vacuum sputtering of a cathode of the material or of a precursor of the material to be deposited, often known as magnetron sputtering technique in the field. Such a technique is today extensively used and well-known in particular when the coating to be deposited consists of a more complex stack of successive layers of thicknesses of a few nanometers or a few tens of nanometers. The metallic interlayer(s) according to the invention (IL) is/are deposited by the sputtering of a target made of the corresponding metal, in a neutral atmosphere of a noble gas, generally argon. For example, a Ti-made interlayer is deposited by the sputtering of a titanium target in a 100% argon atmosphere. However, it stands possible that part of this interlayer can be partially oxidized or nitrided during the heat treatment process such as a bending or a tempering in the final glazing.

The invention and its advantages are described in more detail below, by means of the non-limiting examples below, which are according to the invention and comparative. In all the examples and the description, unless otherwise specified, the thicknesses given are geometric thicknesses.

All the substrates of the examples are made of clear glass with a thickness of 2 mm of Planiclear type sold by Saint-Gobain Glass France. All the layers are deposited in a known way by magnetic field-assisted cathode sputtering, often called magnetron cathode sputtering as mentioned above.

In a well-known way, the different successive layers are deposited in the successive compartments of the cathode sputtering device, each compartment being provided with a specific metal target made of Si (doped with aluminium) or Ti in the appropriate atmosphere, as chosen for the deposition of a specific layer of the stack.

More specifically, the layers of silicon nitride are deposited in compartments of the device from a metallic silicon target (doped with 8% by weight of aluminum), in a reactive atmosphere containing nitrogen mixed with argon. The silicon nitride layers thus also contain aluminum.

More specifically, the layers of silicon oxide are deposited in compartments of the device from the same metallic silicon target (doped with 8% by weight of aluminum), in a reactive atmosphere containing oxygen mixed with argon. The silicon oxide layers thus also contain aluminium.

Thus the skilled one will understand that such layers are said to be based on silicon nitride, or silicon oxide within the meaning of the instant invention.

The titanium nitride layers are deposited in other compartments of the device from a pure metallic titanium target in a reactive atmosphere containing exclusively nitrogen and argon.

The titanium interlayers are deposited in compartments of the device from the same pure metallic titanium target in an atmosphere containing exclusively argon.

The conditions for magnetron deposition of such layers are technically well known in the field.

In the examples which follow, the glass substrate was thus successively covered with a stack of layers comprising two functional layers made of titanium nitride (denoted TiN subsequently for convenience, even if the actual stoichiometry of the layer is not necessarily this). The first module $M_1$ placed between the glass surface and the first functional layer $TiN_1$ is made of silicon nitride (denoted $Si_3N_4$ subsequently for convenience, even if the actual stoichiometry of the layer is not necessarily this) for all the examples. Different configurations of the second module $M_2$ and third module $M_3$ were experimented using either silicon nitride or silicon oxide (denoted $SiO_2$ subsequently for convenience, even if the actual stoichiometry of the layer is not necessarily this) to check the capability of the resulting stack to withstand a heating process such as a bending process while providing thermal insulation properties, as a function of the used materials.

The deposition conditions were adjusted according to conventional techniques for a magnetron deposition in order to obtain different stacks, the sequence of layers of which and their thicknesses (in nanometers nm) are given in table 1 below, starting from the glass surface:

TABLE 1

| | Example | | | | | |
|---|---|---|---|---|---|---|
| | Example 1* | Example 2* | Example 3* | Example 4** | Example 5** | Example 6** |
| | Glass substrate | | | | | |
| $Si_3N_4$ | 6 | 6 | 30 | 12 | 15 | 15 |
| TiN ($TiN_1$) | 16 | 16 | 16 | 16 | 16 | 16 |
| Ti | — | — | — | 5 | 5 | 5 |
| $SiO_2$ | — | — | 45 | 40 | 45 | 40 |
| $Si_3N_4$ | 45 | 45 | — | 14 | — | 10 |
| $SiO_2$ | — | — | — | 10 | — | — |
| Ti | — | — | — | 5 | 5 | 3 |
| TiN ($TiN_2$) | 19 | 19 | 19 | 19 | 19 | 19 |
| Ti | — | — | — | 5 | 5 | 5 |
| $Si_3N_4$ | 35 | — | — | — | — | — |
| $SiO_2$ | — | 35 | 35 | 50 | 35 | 35 |

*comparative
**according to the invention

A—MEASUREMENT OF THE CHARACTERISTICS OF THE GLAZINGS

The thermal and optical characteristics of the glass articles thus obtained were measured according to the following principles and standards:

1°) Optical Properties:

The measurements are carried out in accordance with the European standard ISO 9050 (2003). More specifically, the light transmission $T_L$ and the light reflection on the side of the stack $R_{Lc}$ are measured between 380 and 780 nm according to the illuminant $D_{65}$.

2°) Thermal Properties:

The thermal insulation properties of the glass articles are evaluated by determination of the emissivity at normal incidence $\varepsilon_n$ measured on the interior face of the substrate covered with the stack of layers, according to the conditions described in the standard ISO 10292 (1994), Annex A, before and after the thermal bending process.

The light transmission $T_L$, reflection $R_{Lc}$ and normal emissivity $\varepsilon_n$ values (in percentages) are measured for the glazing provided with the stack.

B—RESULTS

The results obtained for the monolithic glass article according to the examples described above are grouped together in table 2, which follows:

TABLE 2

| Example | $R_{Lc}$ | $T_L$ | $\varepsilon_n$ after bending | number of cracks after bending (per 500 cm²) |
|---|---|---|---|---|
| 1 (comp.) | 4 | 35 | 22 | >10000 |
| 2 (comp.) | 12 | 34 | 29 | 200 |
| 3 (comp.) | 5 | 34 | 37 | 0 |
| 4 (inv.) | 3 | 21 | 21 | 10 |
| 5 (inv.) | 7 | 21 | 23 | 0 |
| 6 (inv.) | 5 | 23 | 22 | 0 |

It is observed that such glass article obtained according to the invention exhibit a low light reflection (less than 10%) without, however, the light transmission being excessively high (around 20 to 25%). Such characteristics make possible the insertion of such glass articles as a part of glazings such as sunroofs as required by the market, that is suitable for a use making possible an unobstructed view of the outside of the vehicle for the occupants of the vehicle or of the building equipped with such glazings.

The article according to the comparative example 1 (according to the previously cited prior art) does not withstand the applied heat treatment as indicated by the very high number of cracks observed. However, its energy insulation performance is acceptable, as indicated by the low emissivity value. The glazing according to the comparative examples 2 and 3, in which some silicon nitride layer(s) have been replaced by other(s) of silicon oxide, has better resistance to the heat treatment but degraded thermal insulation properties.

By comparison, examples 4 to 6 according to the invention present the best compromise between the resistance to heat treatment and the thermal insulation performance. In particular, examples 5 and 6 exhibit emissivity values comparable to those obtained for the stacks of the prior art (see example 1), but no cracks after the bending process.

The invention claimed is:

1. A glass article with solar control properties, comprising at least one glass substrate provided with a stack of layers, wherein the stack of layers comprises successively, starting from a surface of said substrate:
   a first module $M_1$ made of at least one layer, said at least one layer of the first module $M_1$ comprising dielectric material,
   a first layer $TiN_1$ comprising titanium nitride,
   a second module $M_2$ made of at least one layer, said at least one layer of the second module $M_2$ comprising dielectric material consisting of an oxide of silicon optionally doped with aluminum and having a thickness from 20 nm to 100 nm,
   a second layer $TiN_2$ comprising titanium nitride,
   a third module $M_3$ made of at least one layer,
   wherein a cumulative sum of thicknesses of the $TiN_1$ and $TiN_2$ layers comprising titanium nitride is between 25 and 60 nm, wherein the at least one layer of the third module $M_3$ consists of an oxide of silicon optionally doped with aluminum and having a thickness from 20 to 65 nm, and
   wherein an interlayer IL of titanium, aluminum, silicon, an alloy of at least two of these elements, or of a nickel chromium alloy, is deposited between said second layer $TiN_2$ and said third module $M_3$, a thickness of said interlayer IL being between 0.5 nm and 7 nm.

2. The glass article according to claim 1, wherein the stack of layers comprises successively from the surface of said substrate:
   the first module $M_1$ comprising a layer of a dielectric material of thickness $t_1$ or a set of layers of dielectric materials of cumulative thickness $t_1$,
   the first $TiN_1$ layer comprising titanium nitride, with a thickness of between 10 nanometers and 30 nanometers,
   the second module $M_2$,
   the second $TiN_2$ layer comprising titanium nitride, with a thickness of between 10 nanometers and 30 nanometers,
   the third module $M_3$.

3. The glass article according to claim 1, wherein said interlayer IL is in direct contact with said layer of oxide of silicon optionally doped with aluminum of the third module.

4. The glass article according to claim 1, comprising the following layer sequence:
   $TiN_2$/IL/SiO/optionally TiZrO,
   in which SiO represents said layer that consists of an oxide of silicon optionally doped with aluminum of the third module, and TiZrO represents a layer of an oxide of titanium, an oxide of zirconium or an oxide of titanium and zirconium.

5. The glass article according to claim 4, wherein, in the sequence,
   $TiN_2$/IL/SiO/optionally TiZrO,
   each layer is in direct contact with the next layer,
   wherein, when TiZrO is present, a thickness of the layer of an oxide of titanium, an oxide of zirconium or an oxide of titanium and zirconium is between 1 and 5 nm, and
   wherein the interlayer IL represents a layer obtained by deposition of titanium or an alloy comprising titanium.

6. The glass article according to claim 1, wherein the first module $M_1$ comprises a layer comprising silicon nitride.

7. The glass article according to claim 6, wherein the first module $M_1$ consists of a layer of silicon nitride.

8. The glass article according to claim 1, wherein at least one interlayer IL of titanium, aluminum, silicon, an alloy of at least two of these elements, or of a nickel chromium alloy, is deposited within the stack of layers between a) the first layer $TiN_1$ and/or the second layer $TiN_2$ and b) said layer consisting of an oxide of silicon optionally doped with aluminum of the second module $M_2$, said interlayer having a thickness of between 1 and 7 nm.

9. The glass article according to claim 8, wherein the stack of layers comprises the following layer sequence:
   $TiN_1$/IL/SiO/IL/$TiN_2$,
   where SiO represents the layer that consists of an oxide of silicon optionally doped with aluminum of the second module.

10. The glass article according to claim 8, wherein the stack of layers comprises the following layer sequence:
    $TiN_1$/IL/SiO/$SiN_x$/optionally IL/$TiN_2$
    where $SiN_x$ represents a layer comprising silicon nitride, SiO represents the layer that consists of an oxide of silicon optionally doped with aluminum of the second module.

11. The glass article according to claim 10, wherein a ratio between a thickness of the SiO layer and $SiN_x$ layer thickness comprised in the second module $M_2$ is higher than 2.

12. The glass article according to claim 8, wherein the stack comprises the following layer sequence:

$TiN_1/IL/SiO/SiN_x/SiO(N)/IL/TiN_2$ where $SiN_x$ represents a layer comprising silicon nitride, SiO represents the layer that consists of an oxide of silicon optionally doped with aluminum of the second module, SiO(N) represents a layer comprising an oxide of silicon or an oxynitride of silicon.

13. The glass article according to claim 8, wherein the stack of layers is constituted by the succession of layers from the surface of the substrate:

(Glass)/$SiN_x$/$TiN_1$/IL/SiO(1)/IL/$TiN_2$/IL/SiO(2)/optionally TiZrO, where $SiN_x$ represents a layer comprising silicon nitride, SiO(1) represents the layer that consists of an oxide of silicon optionally doped with aluminum of the second module, SiO(2) represents the layer that consists of an oxide of silicon optionally doped with aluminum of the third module, and TiZrO represents a layer of an oxide of titanium, an oxide of zirconium or an oxide of titanium and zirconium.

14. The glass article according to claim 8, wherein the stack comprises the following layer sequence:

(Glass)/$SiN_x$/$TiN_1$/IL/SiO(1)/$SiN_x$/optionally IL/$TiN_2$/IL/SiO(2)/optionally TiZrO, where $SiN_x$ represents a layer comprising silicon nitride, SiO(1) represents the layer that consists of an oxide of silicon optionally doped with aluminum of the second module, SiO(2) represents the layer that consists of an oxide of silicon optionally doped with aluminum of the third module and TiZrO represents a layer of an oxide of titanium, an oxide of zirconium or an oxide of titanium and zirconium.

15. The glass article according to claim 8, wherein a thickness of the layer comprising an oxide or oxynitride of silicon of the second module $M_2$ is greater than 20 nm.

16. The glass article according to claim 1, wherein IL is a layer obtained by deposition of titanium or an alloy comprising titanium.

17. The glass article according to claim 1, wherein the first layer $TiN_1$ has a thickness of between 10 and 25 nm and the second layer $TiN_2$ has a thickness of between 15 and 25 nm, including boundaries.

18. The glass article according to claim 1, wherein a thickness $t_1$ of the first module $M_1$ is from 1 nm to 50 nanometers.

19. A Glazing comprising a single glass article as described in claim 1, wherein the glass substrate is tinted and wherein the stack of layers is positioned on a face of the glazing intended to be exposed toward an inside of a car compartment or a building.

20. A Glazing comprising from an outside a first glass substrate bonded by an intermediate thermoplastic sheet to a glass article as described in claim 1, said intermediate thermoplastic sheet being made of a PVB (polyvinylbutyral) which is optionally tinted, wherein the stack of layers is positioned on a face of the glazing exposed toward an inside of a car compartment.

* * * * *